F. H. BULLARD.
PLIER JOINT CONSTRUCTION.
APPLICATION FILED APR. 27, 1921.

1,428,357.

Patented Sept. 5, 1922.

INVENTOR,
Frederick H. Bullard,
BY
Harry W. Bowen.
ATTORNEY.

Patented Sept. 5, 1922.

1,428,357

UNITED STATES PATENT OFFICE.

FREDERICK H. BULLARD, OF SPRINGFIELD, MASSACHUSETTS.

PLIER JOINT CONSTRUCTION.

Application filed April 27, 1921. Serial No. 464,825.

*To all whom it may concern:*

Be it known that I, FREDERICK H. BULLARD, a citizen of the United States of America, residing at Springfield, in the county of Hampden and Commonwealth of Massachusetts, have invented certain new and useful Improvements in Plier Joint Constructions, of which the following is a specification.

This invention relates to improvements in tools, and more particularly to the joint construction of pliers and like implements.

Broadly, my invention relates to the use of a broad hub or barrel portion that is formed as a part of one of the members of the implement, whereby there is little possibility of any undue wear taking place, and whereby the joint is always held firmly in place.

My invention further relates to the use of a rivet structure for retaining the parts in place and one that does not serve as a bearing about which the two members of the pliers turn.

Further objects and nature of the invention will appear in the body of the specification and will be specifically pointed out in the claims.

Referring to the drawings.

Figure 1:
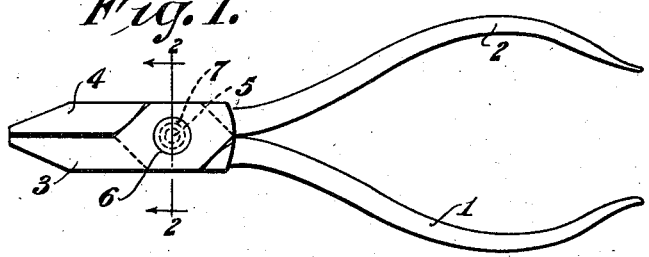
Fig. 1 is a plan view of a pair of pliers showing the usual handle and jaw portions, and the connecting parts in full and dotted lines.
Figure 2:
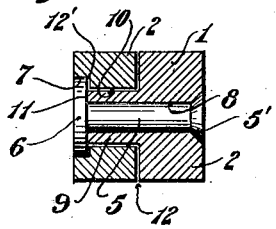
Fig. 2 is a detail sectional view of the joint taken in a plane on the line 2—2 of Fig. 1.

Referring to the drawings in detail:—1 and 2 designate the handle portions and 3 and 4 the usual jaw portions of the pliers. 5 designates a rivet device having an enlarged disc-shaped end portion 6 which has a turning fit in an annular recessed part 7 of the handle portion 2. The shank portion passes through an opening 8 of the other handle member 1, which opening also passes through the hub part 9 of the member 1.

The disc shaped end portion 6 is formed so as to have a good turning fit in the annular recessed part 7. The end 5' of the connecting rivet is set into or secured to the member 1 by pressure or by hammer blows, so that the rivet turns with the handle member 1. The hub portion 9 moves with the handle member 1 and turns in the opening 10 of the handle member 2, and has a bearing therein. The end 11 of the hub portion 9 rests firmly against the inner surface of the disc shaped part 6. A slight clearance space 12 is formed between the inner surfaces of the members 1 and 2 and at 12' between the disc 6 and recess 7.

It will therefore be seen that there is no transverse bearing surface of either member 1 or 2 on the shank part of the rivet 5, but only on the hub 9, opening 10, and at 7, when either one or both of the members 1 and 2 are operated. The rivet 5 turns with the member 1, being secured thereto by the headed end 5', as shown.

It is obvious that no matter how firmly the rivet device is drawn into the member 1 it cannot effect the operation of the implement, since the disc like part rests on the edge end 11 of the hub portion 9. The bearing surfaces are therefore along the edge of the recessed portion 7, opening 10, and surfaces 12.

What I claim is:—

1. A joint for pliers, comprising an integral bearing part on one of the plier members, the other member having an opening therethrough of different diameters, a rivet device fixedly secured to the integral bearing part of one of the members and formed with an integral enlarged part which enters that portion of said opening which is of the larger diameter, and said integral bearing part of the plier member entering the remaining part of said opening, the opposite ends of the rivet device being flush with the outer faces of the pliers and the end of the integral bearing part engaging the inner surface of the enlarged part of the rivet device, whereby the bearing surfaces are confined to the different diameters in said opening.

2. A joint for pliers and like implements, comprising in combination with the two movable members, of an integral hub part forming a part of one of the members, the other member having an opening to movably receive the hub part and constituting a bearing for the hub part, the other movable member having an enlarged recessed part adjacent the bearing for the hub part, a rivet device fixedly secured to and having a part passing through the hub part, and an integral disc portion on the rivet device and located in the enlarged recessed part, said disc portion having a turning fit in the recessed part and the opposite ends of the rivet device being flush with the opposite sides of the two movable members.

FREDERICK H. BULLARD.